W. H. REAGAN, Jr. & J. R. McMURRAY.
CONCENTRATOR HEAD MOTION.
APPLICATION FILED DEC. 6, 1913.
1,159,272.
Patented Nov. 2, 1915.
3 SHEETS—SHEET 1.
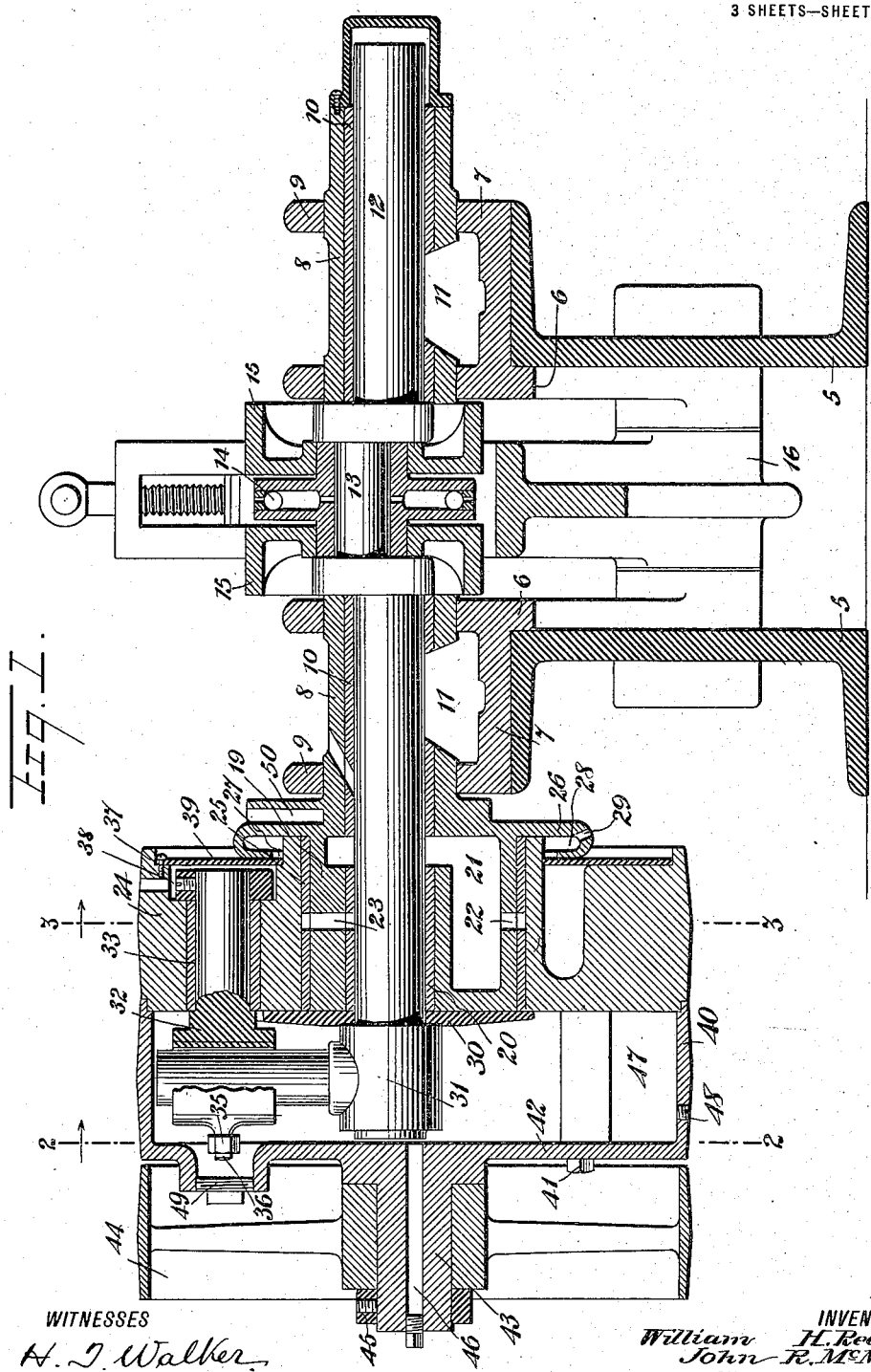
WITNESSES
H. J. Walker
B. Joffe
INVENTORS
William H. Reagan, Jr.
John R. McMurray
BY
Munn & Co
ATTORNEYS

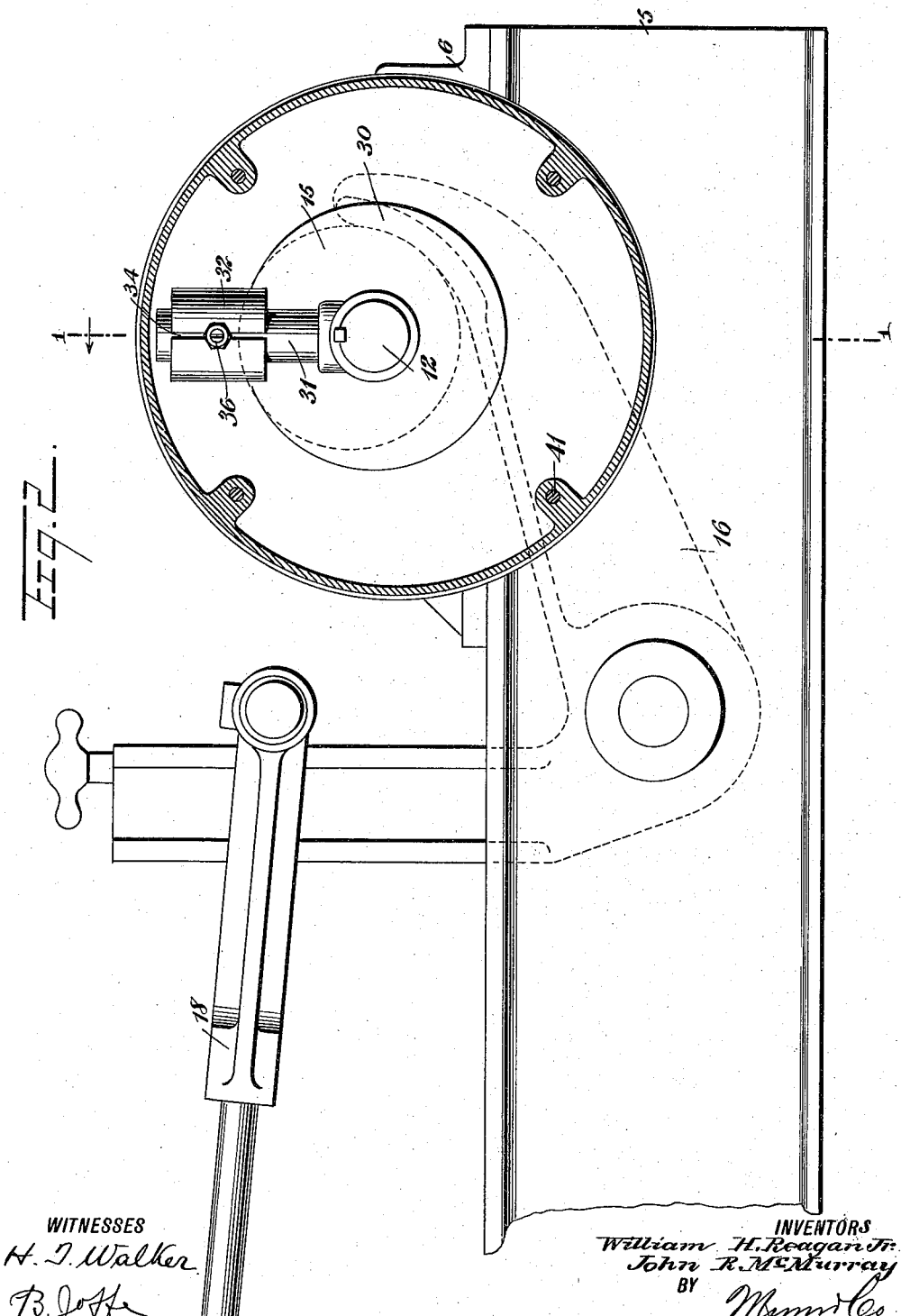

W. H. REAGAN, Jr. & J. R. McMURRAY.
CONCENTRATOR HEAD MOTION.
APPLICATION FILED DEC. 6, 1913.
1,159,272.
Patented Nov. 2, 1915.
3 SHEETS—SHEET 3.
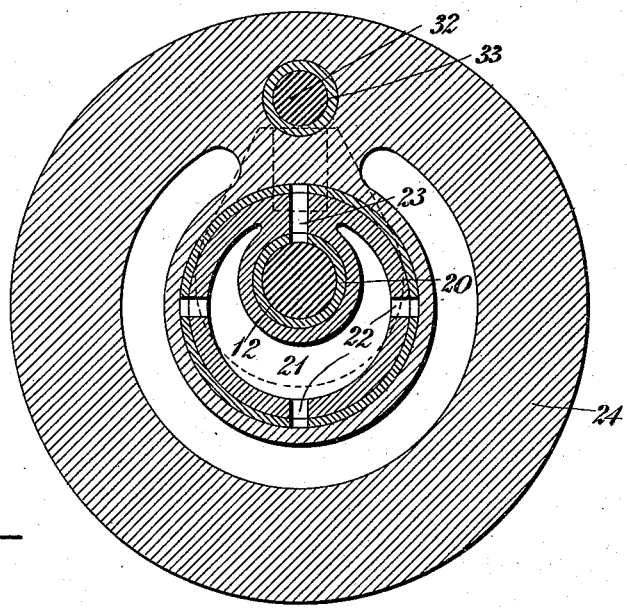
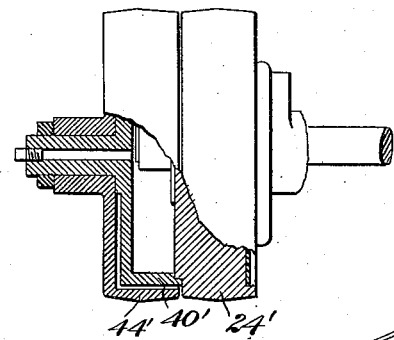
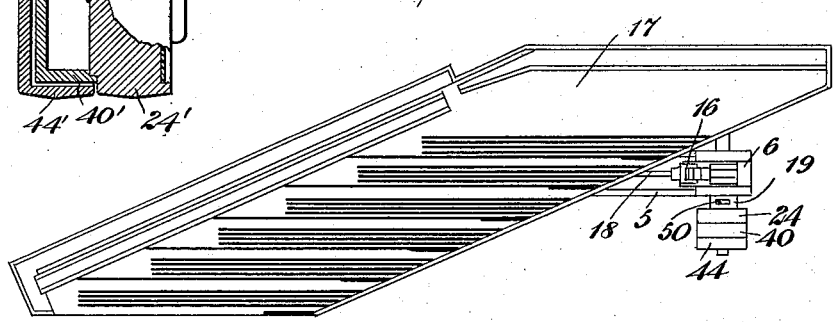
WITNESSES
H. J. Walker
B. Joffe
INVENTORS
William H. Reagan, Jr.
John R. McMurray
BY
Munn & Co.
ATTORNEYS

UNITED STATES PATENT OFFICE.

WILLIAM H. REAGAN, JR., AND JOHN R. McMURRAY, OF MIAMI, ARIZONA.

CONCENTRATOR HEAD-MOTION.

1,159,272. Specification of Letters Patent. Patented Nov. 2, 1915.

Application filed December 6, 1913. Serial No. 805,007.

*To all whom it may concern:*

Be it known that we, WILLIAM H. REAGAN, Jr., and JOHN R. MCMURRAY, citizens of the United States, and residents of Miami, in the county of Gila and State of Arizona, have invented a new and Improved Concentrator Head-Motion, of which the following is a full, clear, and exact description.

Our invention relates to driving mechanisms for concentrators, known in practice as head motion for the same; and an object thereof is to provide a simple, compact, efficient, and strong mechanism wherein a perfect system of lubrication is provided and in which the oil is positively prevented from being thrown out by the centrifugal motion of the parts of the mechanism.

A further object of the invention is to diminish the stress on the end of the main shaft carrying the fly-wheel, pulley, and the loose pulley.

We obtain these objects by the mechanism illustrated in the accompanying drawings, in which:

Figure 1 is a longitudinal section of the head-motion; Fig. 2 is a section on line 2—2, Fig. 1; Fig. 3 is a section on line 3—3, Fig. 1; Fig. 4 is a diagrammatic view of a concentrating table provided with an embodiment of our invention; and Fig. 5 is a modified form of the loose pulley mounted.

Referring to the drawings, 5 represents the beams forming the stand which carries the base or support 6 of the head mechanism secured thereto in any suitable way. The support 6 is provided with a pair of alining bearings 7 disposed transversely to the stand and each having journal casings 8 maintained in said bearing by clamping the same to the support by means of the covers 9 of the bearing. The journal casings 8 are each provided with a bushing 10, and the part of the journal casing 8 and bushing 9 adjacent the bottom of the bearing is cut out, as shown at 11, and therein a receptacle is formed for oil, or waste saturated with oil, for supplying lubricant to the main shaft 12 journaling in the bushings 9. The shaft 12 between the alining bearings is provided with a crank 13 substantially central with the stand and carrying thereon a roller bushing 14 with each side of which is associated a roller 15 engaging a rocker arm 16 which is connected to the concentrating table 17 by means of a connecting rod 18 which is adjustably mounted on the vertical portion of the rocker arm 16.

One of the journal casings 8 is provided with an eccentric portion 19 forming a part of said casing 8 exterior to the support. The eccentric 19 is provided with a bore in alinement with the bore of the casing 8 and lined with a bushing 20 constituting a journal for the main shaft 12, the end of which projects out of the eccentric 19. The eccentric 19 is also cored interiorly, as shown at 21, wherein a receptacle for oil is formed, and from where the oil is distributed to the bearing surfaces by means of the apertures 22 and 23 provided therein. Mounted on the eccentric 19 is a fly-wheel 24 the journaling surface of which is preferably formed by a bushing 25 carried by the fly-wheel and having openings therein adapted to register with openings 22 and 23 in the eccentric 19. The eccentric adjacent the journal casing 8 is provided with a flange portion 26 forming a shallow dish, the opening 27 of which faces the fly-wheel. Part of the dish is under cut, as shown at 28, so as to form a receptacle for the oil carried away by the centrifugal force forming the end of the journaling surfaces of the eccentric and the fly-wheel adjacent said flange. The oil from said receptacle is then conveyed to the drip-pan through the opening 29. The end of the main shaft projecting out of the eccentric 19 receives a flange 30 secured in any suitable way to the main shaft and forming a stop for the fly-wheel 24 whereby the same is prevented from lateral movement on the eccentric. The said projecting end of the main shaft 12 also receives a crank 31 rigidly secured to the main shaft in any suitable way and constrained to rotate therewith. Slidably mounted on the crank 31 is a member 32, which, in turn, is rotatably mounted in a lined aperture 33 of the fly-wheel, whereby said member forms a wrist pin in said fly-wheel. The said member 32 is, preferably, split, as shown at 34, whereby the frictional engagement between the portion of said member 32 and the crank 31 can be adjusted by means of a nut 35 engaging both halves of the threaded stud 36. The member 32 is prevented from lateral displacement in the fly-wheel 24 by the provision of a nut 37 engaging the portion of the member 32 projecting through the lined aperture 33 into the recess 38 provided in the fly-wheel. The portion of the fly-wheel adjacent the flange 26 is, preferably, recessed and therein is adapted to receive a dust-protective flange 39 which excludes oil and dirt from the inner portion of the fly-wheel.

The face of the fly-wheel, where the crank 31 with the wrist pin 32 is positioned is, preferably, provided at the edge with an under-cut engaged by an under-cut provided at the inner edge of the pulley 40 which is secured to the fly-wheel 24 by means of bolts 41, thereby forming a closed receptacle wherein the wrist pin with the crank and the projecting end of the shaft are inclosed. The end wall 42 of the pulley 40 is provided with an extension 43 which forms a bearing for the loose pulley 44 and which is prevented from lateral movement on said extension 43 by means of a stop ring 45 secured to said extension. The extension 43, as can be seen from Fig. 1, is eccentric with reference to the main shaft 12 and is provided with a central bore 46 plugged at its outer end and through which oil is introduced into the receptacle 47, formed by the pulley 40 with the fly-wheel, and from where the oil can be drained by means of the plug 48 provided in the lateral surface of said pulley. It is understood that, if desired, oil can be introduced into the receptacle 47 through the opening engaged by the plug 48, but this is only possible when the device is stationary, while oil can be introduced through the bore 46 during the functioning of the device. The end wall 42 is provided with a plug opening 49 facing the nut 35 wherethrough the same can be operated by a socket wrench.

The driving belt positioned on the loose pulley 44 rotates said pulley on the extension 43 of the pulley 40, which extension is concentric with the rim of the pulley 44, and therefore said pulley can be easily shifted from the said loose pulley to the driving pulley 40. When the belt engages the pulley 40 it causes the rotation of the same on the eccentric 19 which is made stationary by the grip of the cover 9 on the journal casing 8 which forms an integral portion of said eccentric. The rotation of the pulley 40 by the belt, and therewith the fly-wheel 24, causes the rotation of the main shaft 12 through the medium of the member 32 engaging the crank 31. As the shaft rotates with the fly-wheel, the member 32 not only turns in the lined aperture 33 of the fly-wheel, but it slides to and from the axis of the main shaft on the crank 31, this being caused by the eccentricity of the two axes of the main shaft and the stationary eccentric. The said stationary eccentric can be adjusted in the bearing of the support by turning the same therein by means of a lever adapted to engage the socket 50 provided on the eccentric adjacent the flange 26.

The receptacle 47 formed of the pulley 40 and the fly-wheel, which contains oil, lubricates the contacting surfaces of the wrist pin and the crank. It is understood that, if desired, the fly-wheel 24 can carry the belt in place of the pulley 40, so as to reduce the bending moment on the main shaft. It will be seen that by the provision of the closed receptacles 21 and 47 in the eccentric and the driving pulley 40, respectively, which carry oil therein, a perfect lubrication of the parts is obtained. The oil from these lubricating surfaces can only find an outlet at the end of the journaling surface adjacent the flange portion 26, where it is prevented from being thrown by the centrifugal force from the edges of the fly-wheel by the shallow dish formed by the flange 26 as previously described. This provision is very important, as the oil thrown by the centrifugal force against the edges of the belt or fly-wheel and coming in contact with the belt, not only injures the belt but, being thrown by the same on to the concentrating table, makes the same dirty and unsightly.

In the modified structure of the loose pulley, as shown in Fig. 5, the loose pulley 44' is made to incase the member 40' which is carried by the fly wheel 24'. In this structure the belt from the loose pulley can be moved directly to the surface of the fly wheel without passing over the pulley portion forming the receptacle for the oil. This structure brings the fly wheel, with the loose pulley, closer together, which is important where economy of space is necessary.

Having thus described our invention, we claim as new and desire to secure by Letters Patent:

1. In a device of the class described,—a crank shaft; a stationary eccentric associated with said shaft and wherein said shaft is adapted to rotate; a driven member mounted to rotate on said eccentric; means connecting said driven member and said shaft inclosed in said driven member.

2. In a device of the class described,—a crank shaft; a stationary eccentric associated with said shaft and wherein said shaft is adapted to rotate; a driven member mounted to rotate on said eccentric; a wrist pin in said driven member; a crank secured to said shaft and slidably engaging said wrist pin; said driven member inclosing said crank and wrist pin.

3. In a device of the class described,—a crank shaft; an adjustable eccentric engaging said crank shaft and wherein the same is adapted to rotate; a driven member rotatably mounted on said eccentric; means associated with the shaft preventing lateral displacement of said driven member on said eccentric; a wrist pin carried by said driven member adjacent its periphery; a crank carried by said crank shaft adjacent said driven member and slidably engaging said wrist pin; said driven member inclosing said crank and wrist pin.

4. In a device of the class described,—a crank shaft; an eccentric associated with said shaft and wherein said shaft is mounted to rotate; a driven member mounted to rotate on said eccentric; means for transmitting movement through said driven member to said shaft; inclosed in said driven member, said driven member having an extension concentric with the lateral surface thereof; and a pulley mounted to rotate on said extension.

5. In a device of the class described, a crank shaft; an adjustably mounted, stationary eccentric engaging said shaft wherein the same is mounted to rotate, a fly wheel mounted to rotate on said eccentric, a wrist pin in said fly wheel, a crank secured to the shaft and slidably engaging the wrist pin, a pulley rigidly secured to the fly wheel inclosing said wrist pin and crank, said pulley having an extension concentric with the lateral surface thereof, and a pulley mounted to rotate on said extension.

In testimony whereof we have signed our names to this specification in the presence of two subscribing witnesses.

WILLIAM H. REAGAN, Jr.
JOHN R. McMURRAY.

Witnesses:
W. J. Ellery,
S. M. Ellery.

Copies of this patent may be obtained for five cents each, by addressing the "Commissioner of Patents, Washington, D. C."